United States Patent
Roger et al.

(10) Patent No.: US 8,151,200 B2
(45) Date of Patent: Apr. 3, 2012

(54) SENSITIVE INFORMATION HANDLING ON A COLLABORATION SYSTEM

(75) Inventors: Edwin Sidney Roger, Minneapolis, MN (US); Daniel Mark Cundiff, Minneapolis, MN (US); Ari Edwin Olson, Rosemount, MN (US)

(73) Assignee: Target Brands, Inc., Minneapolis, MN (US)

( * ) Notice: Subject to any disclaimer, the term of this patent is extended or adjusted under 35 U.S.C. 154(b) by 1171 days.

(21) Appl. No.: 11/940,742

(22) Filed: Nov. 15, 2007

(65) Prior Publication Data

US 2009/0132651 A1    May 21, 2009

(51) Int. Cl.
*G06F 3/00* (2006.01)
*G06F 3/01* (2006.01)

(52) U.S. Cl. ........ 715/758; 715/234; 715/733; 715/735; 715/751; 715/752; 709/204; 709/223; 709/225

(58) Field of Classification Search ........... 715/235, 715/733, 751, 810, 234, 735, 744, 752, 758; 709/201, 204, 206, 223, 225
See application file for complete search history.

(56) References Cited

U.S. PATENT DOCUMENTS

| | | | | |
|---|---|---|---|---|
| 5,794,006 A * | 8/1998 | Sanderman | ............ | 709/223 |
| 6,718,367 B1 | 4/2004 | Ayyadurai | ............ | 709/206 |
| 6,983,268 B2 | 1/2006 | Seki et al. | ............ | 707/1 |
| 6,988,126 B2 | 1/2006 | Wilcock et al. | ............ | 709/204 |
| 6,996,605 B2 | 2/2006 | Low et al. | ............ | 709/204 |
| 7,437,408 B2 * | 10/2008 | Schwartz et al. | ............ | 709/204 |
| 7,546,334 B2 * | 6/2009 | Redlich et al. | ............ | 709/201 |
| 7,552,467 B2 * | 6/2009 | Lindsay | ............ | 726/5 |
| 7,669,051 B2 * | 2/2010 | Redlich et al. | ............ | 713/166 |
| 7,813,822 B1 * | 10/2010 | Hoffberg | ............ | 700/94 |
| 2002/0073210 A1 | 6/2002 | Low et al. | ............ | 709/228 |
| 2004/0111639 A1 * | 6/2004 | Schwartz et al. | ............ | 713/201 |
| 2005/0138110 A1 * | 6/2005 | Redlich et al. | ............ | 709/201 |
| 2006/0004703 A1 | 1/2006 | Spivack et al. | ............ | 707/2 |
| 2006/0206813 A1 | 9/2006 | Kassan | ............ | 715/530 |
| 2007/0143692 A1 * | 6/2007 | Muller et al. | ............ | 715/751 |
| 2007/0255791 A1 * | 11/2007 | Bodlaender et al. | ............ | 709/206 |
| 2008/0010249 A1 * | 1/2008 | Curtis et al. | ............ | 707/3 |
| 2008/0010609 A1 * | 1/2008 | Curtis et al. | ............ | 715/810 |
| 2008/0091684 A1 * | 4/2008 | Ellis et al. | ............ | 707/10 |
| 2008/0126944 A1 * | 5/2008 | Curtis et al. | ............ | 715/733 |
| 2009/0070665 A1 * | 3/2009 | Chijiiwa et al. | ............ | 715/235 |
| 2009/0094674 A1 * | 4/2009 | Schwartz et al. | ............ | 726/1 |
| 2009/0106163 A1 * | 4/2009 | Foresman et al. | ............ | 705/80 |
| 2009/0112995 A1 * | 4/2009 | Addae et al. | ............ | 709/206 |
| 2009/0249453 A1 * | 10/2009 | Cluck et al. | ............ | 726/5 |

* cited by examiner

*Primary Examiner* — Nicholas Augustine
(74) *Attorney, Agent, or Firm* — Nixon & Vanderhye P.C.

(57) ABSTRACT

On a document collaboration system, such as a wiki, the content of postings to the collaboration system is monitored for sensitive information. Under some embodiments, when instances of such sensitive information are detected, an e-mail is sent to the user that posted the collaboration page posting. In other embodiments, a message is then sent to a person associated with the entity that indicates that the information placed on the collaboration page is confidential information or is related to an asset of the entity. In further embodiments, individual people are assigned responsibility for monitoring the use of certain instances of sensitive information on the collaboration system. Each user is only notified when the instances they are responsible for appear on a collaboration page. In other embodiments, if a collaboration page includes an instance of sensitive information, access to the collaboration page is changed such that fewer people can access the collaboration page.

13 Claims, 6 Drawing Sheets

SENSITIVE INFORMATION HANDLING ON A COLLABORATION SYSTEM

BACKGROUND

A collaboration application is an application that enables its users to manipulate (add to, edit, etc.) a body of substantive content most commonly organized into a collection of informative collaboration documents that are made remotely accessible to the community of users, usually through a search interface.

One example of a collaboration application is a wiki application. A wiki application typically includes a dynamic collection of substantive information organized in the format of a collection of article-type web pages hosted on a site maintained on a computer network. In most cases, a user of the wiki application is able to selectively retrieve an article through a query process that involves a user-submission of one or more search terms that are compared to key words associated with the articles. A typical article will contain hypertext links that can be navigated to other related sources of information including, but not necessarily limited to, other articles within the content of the wiki application.

In general, users are allowed to make edits and additions to the content of the wiki application, Most if not all pages include a link to edit functionality. If a user desires to change the page, he or she simply navigates the link (e.g., thereby causing the wiki application to display a corresponding editing screen). When the user is finished editing, they issue a submit command (e.g., by pressing a submit button) thereby publishing the changes to the content of the wiki application. In general, users are allowed to edit the work of other authors (in contrast to a web log, where changes to material as originally posted are generally not allowed).

Users of a wiki application are also typically allowed to add new pages to the body of content. A new page can be linked by the page creator or by other users to existing pages. The creator and/or other users can edit the content of a new page. Thus, the content of a wiki application grows and adapts as the result of the collective editing and authorship efforts of the wiki application's community of users.

Some collaboration applications are publicly oriented. One example of this is the Wikipedia system, which is an Internet-based encyclopedia project operated by the Wikimedia Foundation, a non-profit organization (see www.wikipedia.com). Other collaboration applications are not open to the general public. For example, some companies operate a wiki application, for example, to create an internal knowledge base.

Because a large number of people make changes to a collaborative document, problems can arise if a user adds offensive content to the document. Some collaborative document systems have filters that prevent the posting of content that includes offensive words. Other systems provide a report to an administrator to indicate any document postings that have included an offensive term.

The discussion above is merely provided for general background information and is not intended to be used as an aid in determining the scope of the claimed subject matter.

SUMMARY

On a document collaboration system, such as a wiki, the content of postings to the collaboration system are monitored for sensitive information. Under some embodiments, when such sensitive information is detected, an e-mail is sent to the user that posted the collaboration page posting. This e-mail warns the user about the use of the information on the collaboration page. In other embodiments, collaboration page postings are searched for information that an entity wishes to keep confidential or that represents an asset of the entity. A message is then sent to a person associated with the entity that indicates that the information placed on the collaboration page is confidential information or is related to an asset of the entity.

In further embodiments, individual people are assigned responsibility for monitoring the use of certain instances of sensitive information on the collaboration system. Thus, one user may be assigned one word while another user will be assigned a different word. Each user is only notified when the instances of sensitive information they are responsible for appear on a collaboration page, thereby allowing efficient monitoring and consistent responses to uses of certain sensitive information on the collaboration pages.

In other embodiments, an indication that a collaboration page has been changed is received and the change to the collaboration page is searched to determine if it includes sensitive information in a list of sensitive information. If a collaboration page includes an instance of sensitive information, access to the collaboration page is changed such that fewer people can access the collaboration page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

On a document collaboration system, such as a wiki or knowledge management system, embodiments described below track the content of postings to determine if the postings include sensitive information. Such postings can include new collaboration pages or revisions to existing collaboration pages. Under some embodiments, when such sensitive information is detected, an e-mail is sent to the user that posted the collaboration page posting. This e-mail warns the user about the use of the information on the collaboration page. By sending the message in a separate e-mail, the embodiments described below have more impact on a user than just sending a message within the collaboration application because such e-mails are perceived as being part of a larger notification framework that is likely to involve an administrator or supervisor. As such, users are typically better motivated by an e-mail message to correct the posting to remove the sensitive information than if the user was simply warned within the collaboration application.

In other embodiments, collaboration page postings are searched for information that an entity wishes to keep confidential or that represents an asset of the entity. A message is then sent to a person associated with the entity that indicates that the information placed on the collaboration page is confidential information or is related to an asset of the entity. Providing messages that a collaboration page posting includes confidential information allows action to be taken to prevent the unwanted disclosure of confidential information.

In further embodiments, individual people are assigned responsibility for keeping particular instances of sensitive information from appearing on collaboration pages on a collaboration system or for ensuring that the instances of sensitive information are used properly on the collaboration pages. Thus, one user may be assigned a word or phrase associated with a first confidential project while another user will be assigned a different word or phrase assigned with a second confidential project. Each user is only notified when the instances of sensitive information they are responsible for appear on a collaboration page, thereby allowing efficient monitoring and consistent responses to uses of certain instances of sensitive information on the collaboration pages.

In other embodiments, an indication that a collaboration page has been changed is received and the change to the collaboration page is searched to determine if it includes an instance of sensitive information in a list of sensitive information. If a collaboration page includes an instance of sensitive information, access to the collaboration page is changed such that fewer people can access the collaboration page. This helps to reduce access to collaboration pages that have confidential or proprietary information stored on them while still allowing some access to the collaboration pages.

Figure 1:
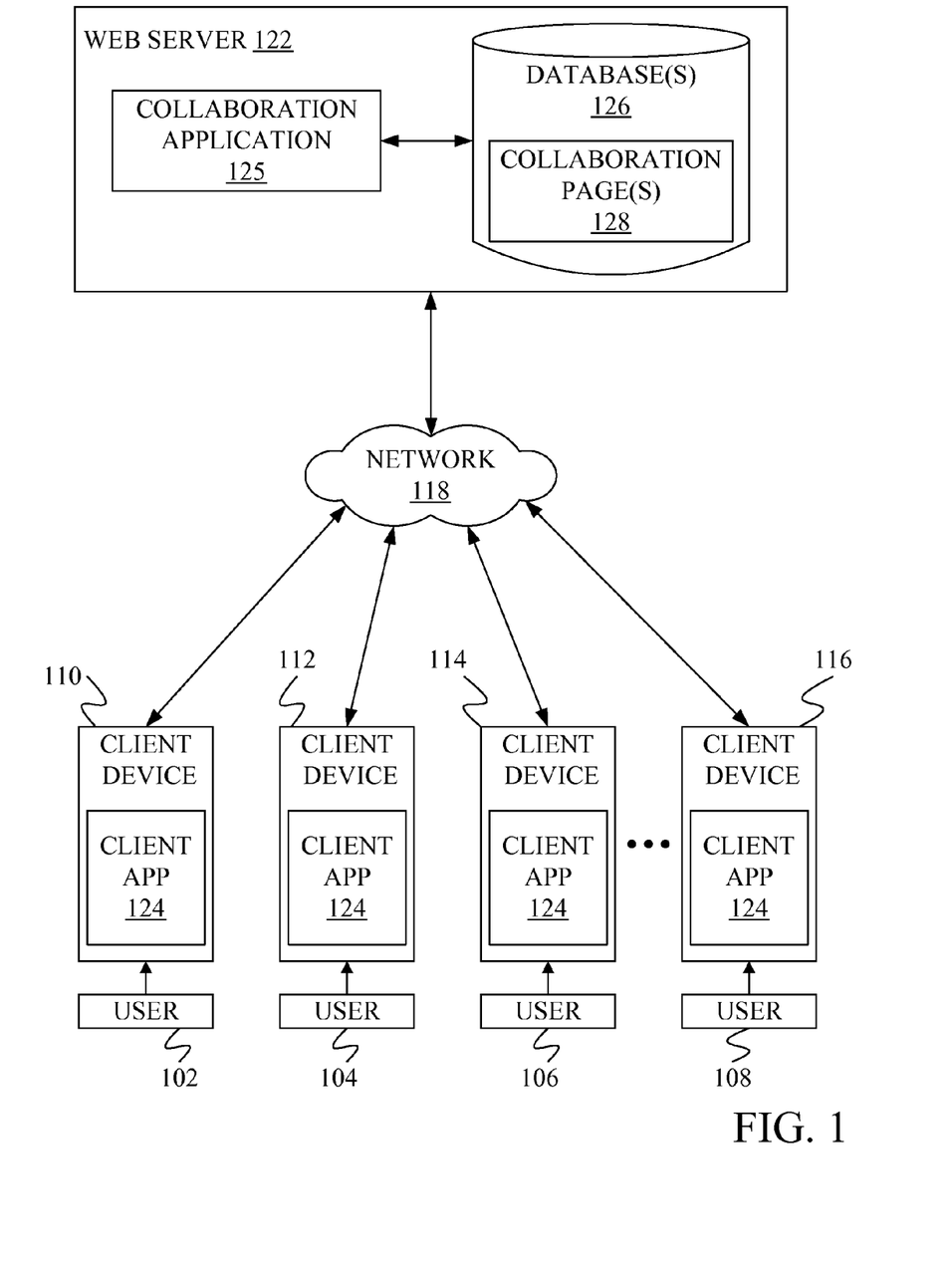
FIG. 1 is a block diagram of a client server environment for collaboration systems under one embodiment.

FIG. 1 is a schematic diagram of a collaboration application environment 100. Environment 100 is but one example of an environment in which embodiments disclosed herein may be implemented. Environment 100 is not intended to suggest any limitation as to scope of use or functionality. Neither should environment 100 be interpreted as having any dependency or requirement relating to any one or combination of illustrated components.

Within environment 100, a plurality of users 102, 104, 106 and 108 are shown as interacting with a plurality of corresponding client computing devices 110, 112, 114 and 116. An illustrative four users and client devices are shown in environment 100 but an actual implementation is just as likely to include more or fewer. Each client computing device interacts across a network 118 with a web server 122. Network 118 can be public in nature (e.g., the Internet, etc.) or more internally focused (e.g., a corporate LAN, a private WAN, etc.).

Web server 122 controls access to and communication with a collaboration application 125, which has associated databases 126. Examples of collaboration application 125 include a wiki application and a knowledge management application, under some embodiments. Web server 122 may comprise a single computing device or multiple computing devices and portions of collaboration application 125 and or databases 126 may be stored on a single computing device or may be distributed across several computing devices. The illustrated scenario is but an example configuration. Together, collaboration application 125 and databases 126 form a collaboration system, such as a wiki or a knowledge management system.

In one embodiment, web server 122 is a computing device responsible for serving web pages (e.g., HTML documents) via the HTTP protocol to client devices 110, 112, 114 and 116. Collaboration application 125 generates web pages passed by web server 122 based on content stored for collaboration pages 128, for example content stored for wiki pages, or knowledge management documents, in databases 126. Each of devices 110, 112, 114 and 116 includes a client application 124 (e.g., a web browser application) that is able to parse the web pages provided by web server 122 and to display the parsed documents. Client application 124 is also able to collect textual input from the user and to send that input to collaboration application 125 through web server 122. In addition, client application 124 is able to interpret certain actions by the user as requests to follow links embedded in the web pages and based on such requests is able to request further pages from collaboration application 124 through web server 122. It should be noted that though the reference numeral 124 has been assigned to represent the client application on all of client devices, in actuality, different client devices could operate different client device applications. The consolidation of the reference numeral is solely for the purpose of simplifying the diagram.

In one embodiment, not by limitation, collaboration application 125 is implemented as a server-side script that runs on web server 122, with the content generally stored in database 126, which illustratively includes a relational database management system. In another embodiment, however, a server file system associated with web server 122 can be used for data management also or instead.

Accordingly, in one embodiment, web server 122, collaboration application 125 and database 126 together enable each of users 102, 104, 106 and 108 to utilize client applications 124 to read, edit and write their own contributions to one or more collaboration documents 128. The users are illustratively able to include links to other pages in the set of collaboration pages 128, external links to the Internet or an Intranet and incorporate other content in the form of text, images, audio, video, etc. The collaboration application 125 manages the collaboration processes, including the publication of the collaboration pages 128, storage of revision information including the identity of the author who revised content, the date and time the revision was made, and the revisions that were made. The collaboration application 125 also includes the ability to call external applications when certain events occur as noted further below.

Figure 2:
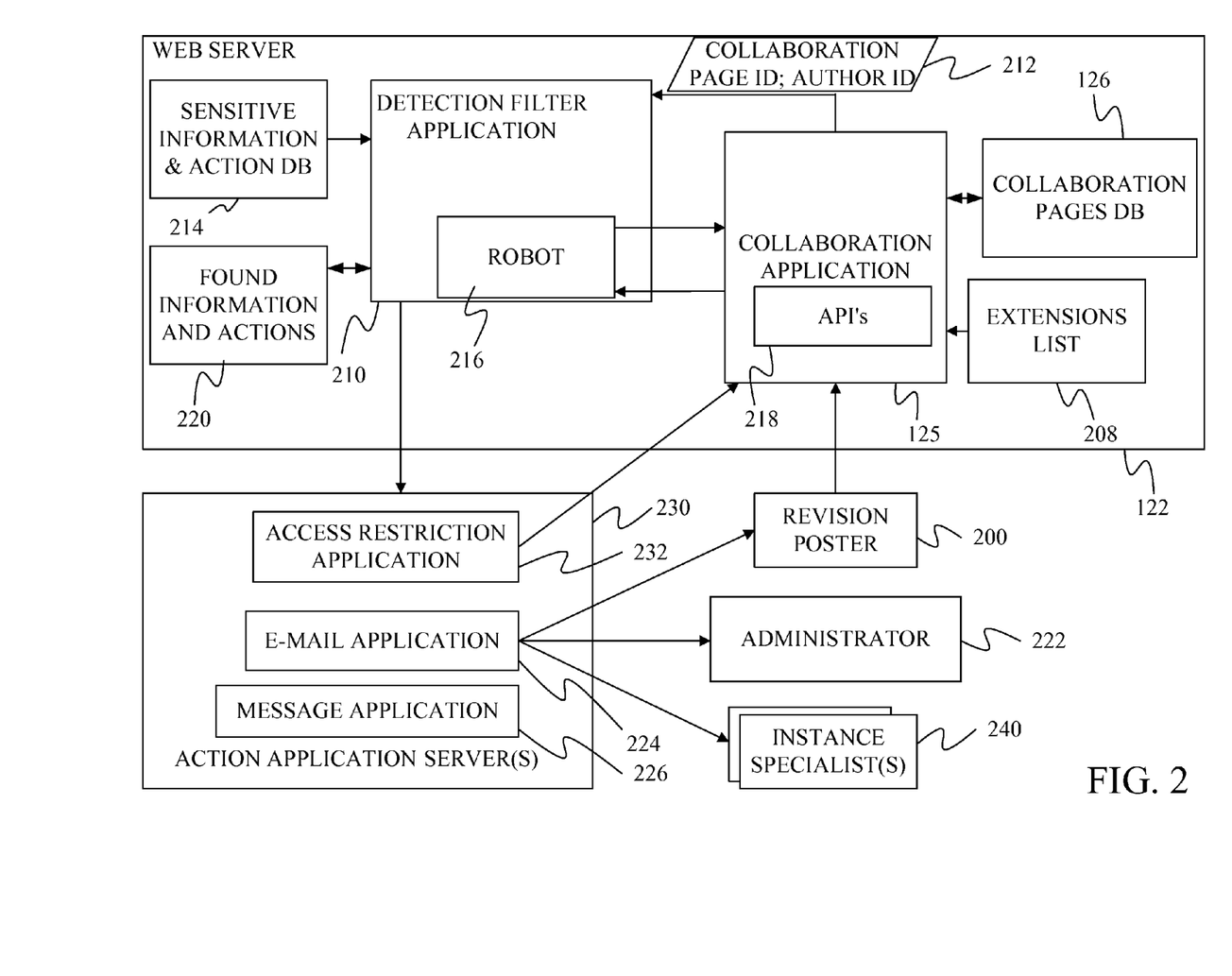
FIG. 2 is a block diagram of a collaboration system showing elements used in handling sensitive information under one embodiment.
Figure 3:
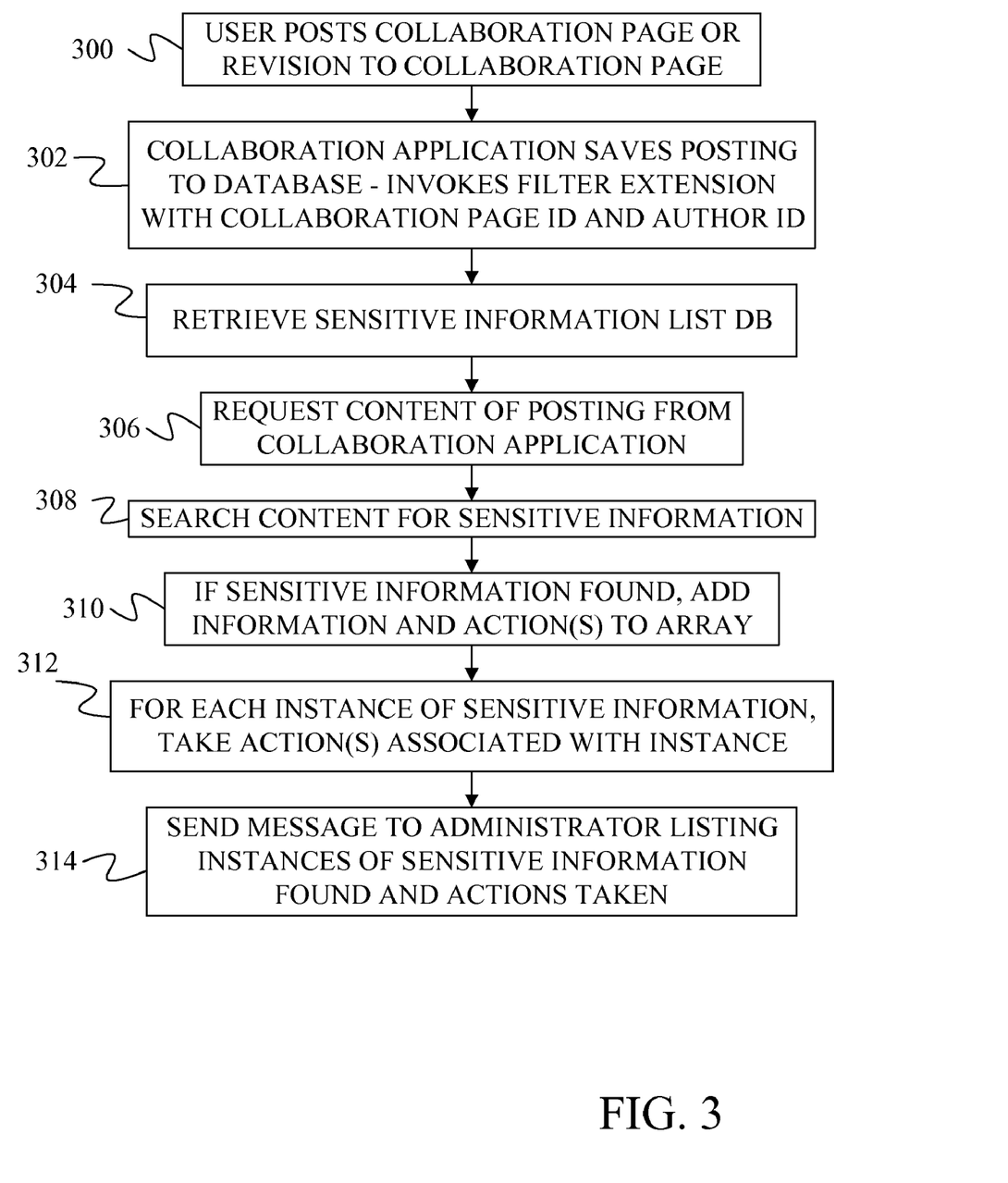
FIG. 3 is a flow diagram of a method of detecting and taking action based on sensitive information in a posting under one embodiment.

FIG. 2 provides a block diagram of elements used to detect and react to sensitive words added to a collaboration page. FIG. 3 provides a flow diagram for detecting and reacting to such sensitive words.

In step 300 of FIG. 3, a revision poster (user) 200 indicates that they wish to save a posting to a collaboration document using collaboration application 125. (In FIG. 2, network 118, client application 124, and client devices 110, 112, 114 and 116 are not shown for simplicity but should be understood to be present to provide communication between revision poster 200 and collaboration application 125.) Collaboration application 125 stores the collaboration document on collaboration page's database 126 at step 302. After saving the collaboration document, collaboration application 125 examines an extensions list 208 that lists external applications that are to be called during a save operation. Under one embodiment, extensions list 208 is a text document that is altered by an administrator of the collaboration system. Extension list 208 identifies detection filter application 210 as an application to be invoked upon saving a change to a collaboration document. Based on its inclusion in extension list 208, detection filter application 210 is invoked by collaboration application 125. As part of invoking detection filter 210, collaboration application 125 passes the collaboration page ID that identifies the collaboration document that has been revised as well as the author ID that identifies revision poster 200. The collaboration page ID and author ID are shown as parameters 212 in FIG. 2.

At step 304, detection filter application 210 retrieves a sensitive information and action database 214. Sensitive information and action database 214 includes a list of instances of information that are considered sensitive for the collaboration documents. Sensitive information can include offensive words and phrases, words and phrases that are considered confidential to an entity, words and phrases that are considered proprietary to an entity, and words and phrases that are associated with an asset of an entity, for example. Such assets can include trade secrets, trademarks, patents, development projects, products under development, joint ventures, investments, customers, and financial information, for example. Other examples of sensitive information include project identifiers, locations, names, financial information, charts, filenames and important dates, for example. The embodiments described herein may be practiced for any instance of sensitive information such as a word, phrase, project identifier, location, employee name, financial information, chart, filename or important date, for example.

Sensitive information and action database 214 also includes one or more actions for each instance of sensitive information where each action represents a function that is to be performed if the instance of sensitive information is detected in a collaboration document. Each listed action can include a function name and parameters that are to be passed to the function to perform the action. Under one embodiment, the sensitive information and actions listed in sensitive information and action database 214 are set by an administrator 222. In other embodiments, any user with authority to modify a collaboration page or post a new collaboration page may add an instance of sensitive information and action to sensitive information and action database 214.

At step 306, detection filter application 210 requests the content of the revised collaboration document from collaboration application 125. Under one embodiment, detection filter application 210 performs this request by invoking a robot 216. Robot 216 uses the collaboration page ID and the author ID received by detection filter application 210 and application programming interfaces 218 in collaboration application 125 to request the content of the revised collaboration document. Examples of APIs 218 include APIs used to query collaboration pages databases 126 for the posting and APIs for parsing the text of the posting.

At step 308, detection filter application 210 searches the content of the last posting for any instances of sensitive information in sensitive information and action database 214. If an instance of sensitive information from sensitive information and action database 214 is found in the content of a posting, the instance of sensitive information and its associated actions are loaded into a found information and actions array 220 at step 310. At step 312, detection filter application 210 invokes applications on an action application server 230 to take the actions in actions array 220. Examples of such actions are discussed below in connection with FIGS. 4-7. For example, such actions can include sending an e-mail message to the revision poster, changing a security access level for the collaboration document, and sending a message to a user, referred to as a specialist, responsible for the sensitive information. Although the action applications are shown on a separate action application server 230 in FIG. 2, in other embodiments the action applications may be stored on web server 122 or may each be stored on separate servers.

At step 314, detection filter application 210 sends a message to an administrator 222 listing the instances of sensitive information that were found, the actions that have been taken, the identity of the revision poster, and the collaboration page ID. Under one embodiment, this message is sent using an e-mail application 224. In other embodiments, a different message application 226 may be used to send the message to administrator 222. The message application 226 may be an instant messaging application or a report application that generates a markup language page indicating which instances of sensitive information have been found and the actions that have been taken. In general, administrator 222 is responsible for maintaining the collaboration system and insuring that the collaboration documents in collaboration pages databases 126 meet the standards set for such collaboration documents.

Figure 4:
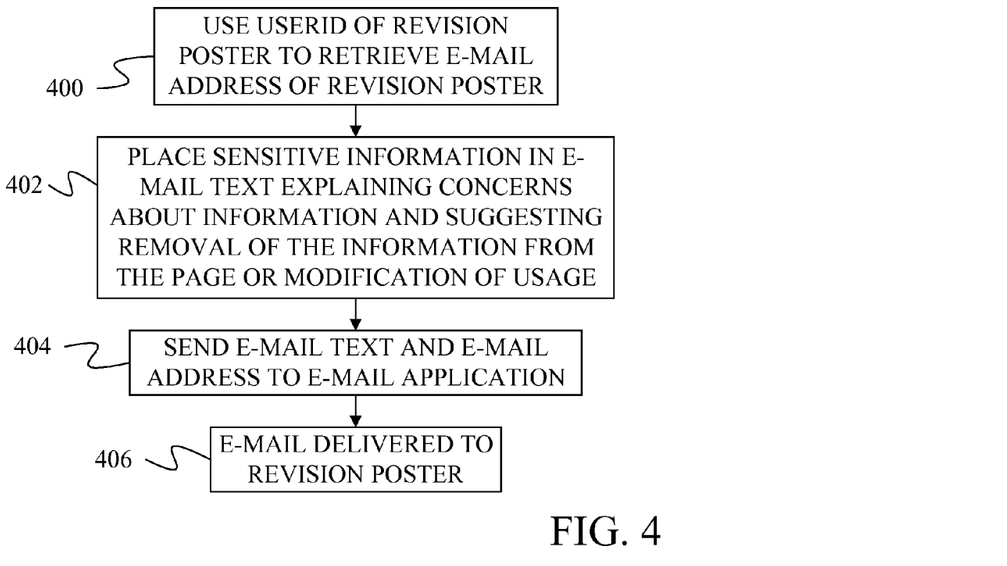
FIG. 4 is a flow diagram of one action that may be taken after detecting sensitive information under one embodiment.

FIG. 4 provides a flow diagram of one action that may be taken when an instance of sensitive information is found in a collaboration document posting. At step 400 of FIG. 4, the user ID of revision poster 200, which is passed by collaboration application 125 to detection filter application 210, is used by detection filter application 210 to retrieve an e-mail address for revision poster 200. Under some embodiments, collaboration application 125 maintains a list of e-mail addresses for each user authorized to post documents or revisions to collaboration application 125. In such embodiments, detection filter application 210 uses robot 216 to request the e-mail address of the revision poster from collaboration application 125. In other embodiments, detection filter application 210 access a database that is separate from collaboration application 125 to determine the e-mail address of revision poster 200 based on the user ID of revision poster 200. For example, detection filter application 210 may access a network database that associates a local area network ID (LAN ID) for revision poster 200 with an e-mail address for revision poster 200.

At step 402, detection filter application 210 places the detected sensitive information in e-mail text explaining concerns about the information and suggesting removal of the information from the page or different usage of the information, for example. At step 404, detection filter application 210 sends the e-mail text and the e-mail address of the revision poster to an e-mail application such as e-mail application 224 on action application servers 230. E-mail application 224 then delivers the e-mail to revision poster 200 at step 406.

The action of sending an e-mail to revision poster 200 to indicate that their post contains sensitive information and explaining concerns about the information provides a heightened response to the inclusion of sensitive information in a collaboration document. In particular, many users perceive the reception of an e-mail outside of the collaboration application as an indication that the sensitive information has triggered a larger response than if a simple warning is provided by the collaboration application itself. In addition, many users perceive the sending of an e-mail as an indication that others at an entity have been informed that the revision poster posted a collaboration document that included sensitive information. This helps to entice the revision poster 200 to remove the sensitive information from their posting or to correct the usage of the sensitive information in the posting as quickly as possible.

Figure 5:
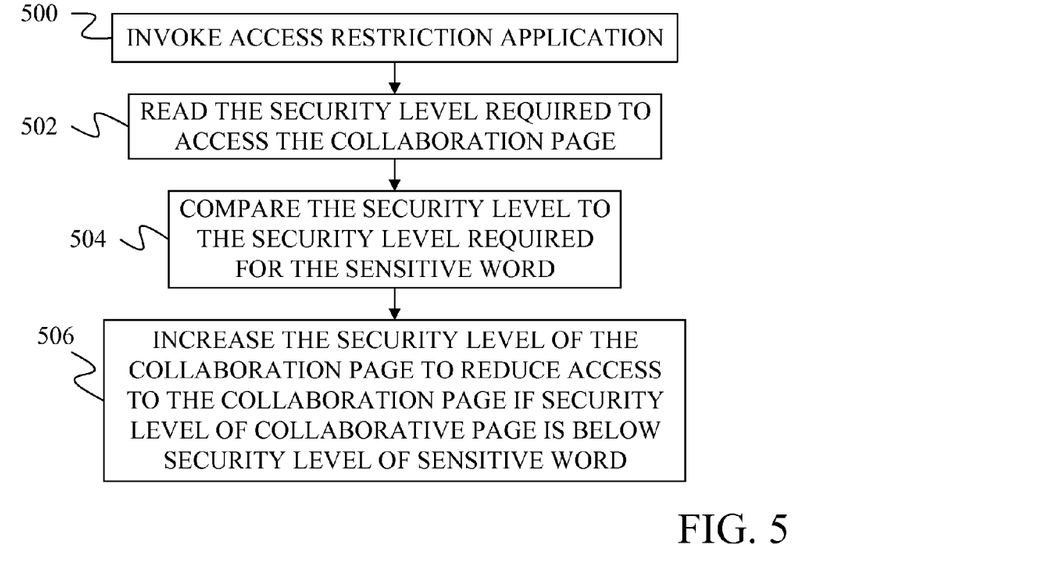
FIG. 5 is a flow diagram of another action that may be taken upon detecting sensitive information under one embodiment.
Figure 6:
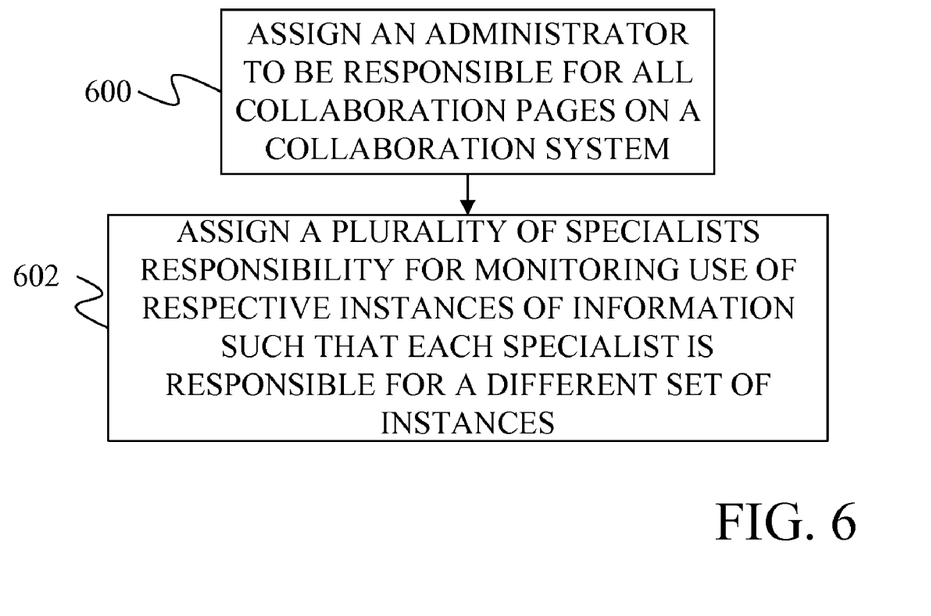
FIG. 6 is a flow diagram of a method for establishing administrators and specialists under one embodiment.

FIG. 5 provides a flow diagram of a second action that may be taken when an instance of sensitive information is detected in a collaboration document posting. At step 500, detection filter application 210 invokes an access restriction application 232 on action application servers 230. Although access restriction application 232 is shown as being separate from web server 122 in FIG. 2, in other embodiments, access restriction application 232 may be stored on web server 122. In further embodiments, access restriction application 232 may be incorporated within detection filter application 210. At step 502, access restriction application 232 reads the security level required to access the collaboration page that has been revised. Under one embodiment, access restriction application 232 reads the security level using APIs 218 of collaboration application 125 to request the security level. At step 504, access restriction application 232 compares the security level of the collaboration page to the security level required for the sensitive information. Under some embodiments, the security level for the sensitive information is stored as a parameter of the action in sensitive information and action database 214 and is passed to action restriction application 232 by detection filter application 210.

At step 506, access restriction application 232 increases the security level of the collaboration page to reduce access to the collaboration page if the security of the collaboration page is below the security level required for the sensitive information. Under some embodiments, access restriction application 232 increases the security level of the collaboration page by calling APIs 218 of collaboration application 125 to set a new security level for the collaboration page in collaboration pages database 126. This new security level is such that fewer users can access the collaboration page but at least one user is still able to access the collaboration page.

By increasing the security level of the collaboration page to reduce access to the collaboration page, this embodiment reduces access to the sensitive information thereby helping to preserve the confidentiality or proprietary nature of the sensitive information while at the same time allowing some users access to the collaboration page so that the collaboration page can be further modified, if desired, to either remove the sensitive information, or to alter the text referring to the sensitive information so that it meets standards set for the sensitive information. Once such corrections are made, the security level of the collaboration page can be returned to its previous level so that more users may access the collaboration page. Note that changing the security level of the collaboration page is less severe than simply deleting the collaboration page posting. Changing the security level allows the content of the posting to be maintained so that all of the work associated with the posting is not lost simply because the posting included an instance of sensitive information.

In further embodiments, an instance specialist 240 is notified when a particular instance of sensitive information appears in a collaboration page. As shown in the flow diagram of FIG. 6, in such embodiments, an administrator such as administrator 222 is assigned to be responsible for all collaboration pages on the collaboration system at step 600. In step 602, a plurality of users are set as specialists who are assigned responsibility for monitoring use of respective instances of sensitive information such that each specialist is responsible for a different set of instances. For example, one instance specialist may be associated with sensitive words associated with a first business project while a second specialist would be associated with sensitive words associated with a second business project. By assigning particular instances to particular instance specialists while also maintaining an administrator who has responsibility for all collaboration pages, this embodiment lightens the work load for the administrator 222 and provides more consistent responses to the use of sensitive information since the instance specialist 240 will develop an expertise for handling the use of their assigned instances of sensitive information in collaboration pages.

Figure 7:
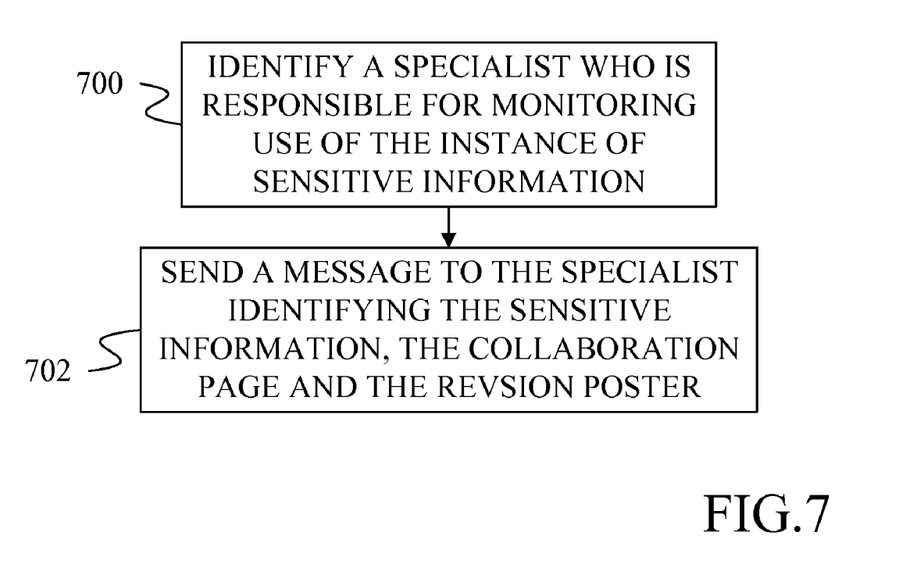
FIG. 7 is a flow diagram of an action that can be taken to inform certain users when an instance of sensitive information is found in a collaboration document under one embodiment.

When instance specialists are used, one possible action that can be taken is shown in the flow diagram of FIG. 7. In FIG. 7, a specialist who is responsible for monitoring the use of an instance of sensitive information is identified at step 700. Under one embodiment, the instance specialist is identified using a parameter stored in the sensitive information and action database 214 for the action, for example. After identifying the specialist, detection filter application 210 sends a message to the specialist identifying the instance of sensitive information, the collaboration page, and the identity of the revision poster at step 702. The message may be sent using e-mail application 224 to send an e-mail to instance specialist 240 or the message may be sent using message application 226. Message application 226 may include applications that form instant messages as well as applications that create reports that are then sent to the instance specialist 240 or stored in a file that instance specialist 240 can access.

The methods and components discussed above may be implemented using computing devices that execute computers executable instructions that are stored or encoded on computer-readable media. For example, web server 122, action application server(s) 230 and client devices 110, 112, 114 and 116 represent computing devices that execute computer-executable instructions representing collaboration application 125, API's 218, diction filter application 210, robot 216, access restriction application 232, e-mail application 224, message application 226 and client application 124.

Figure 8:
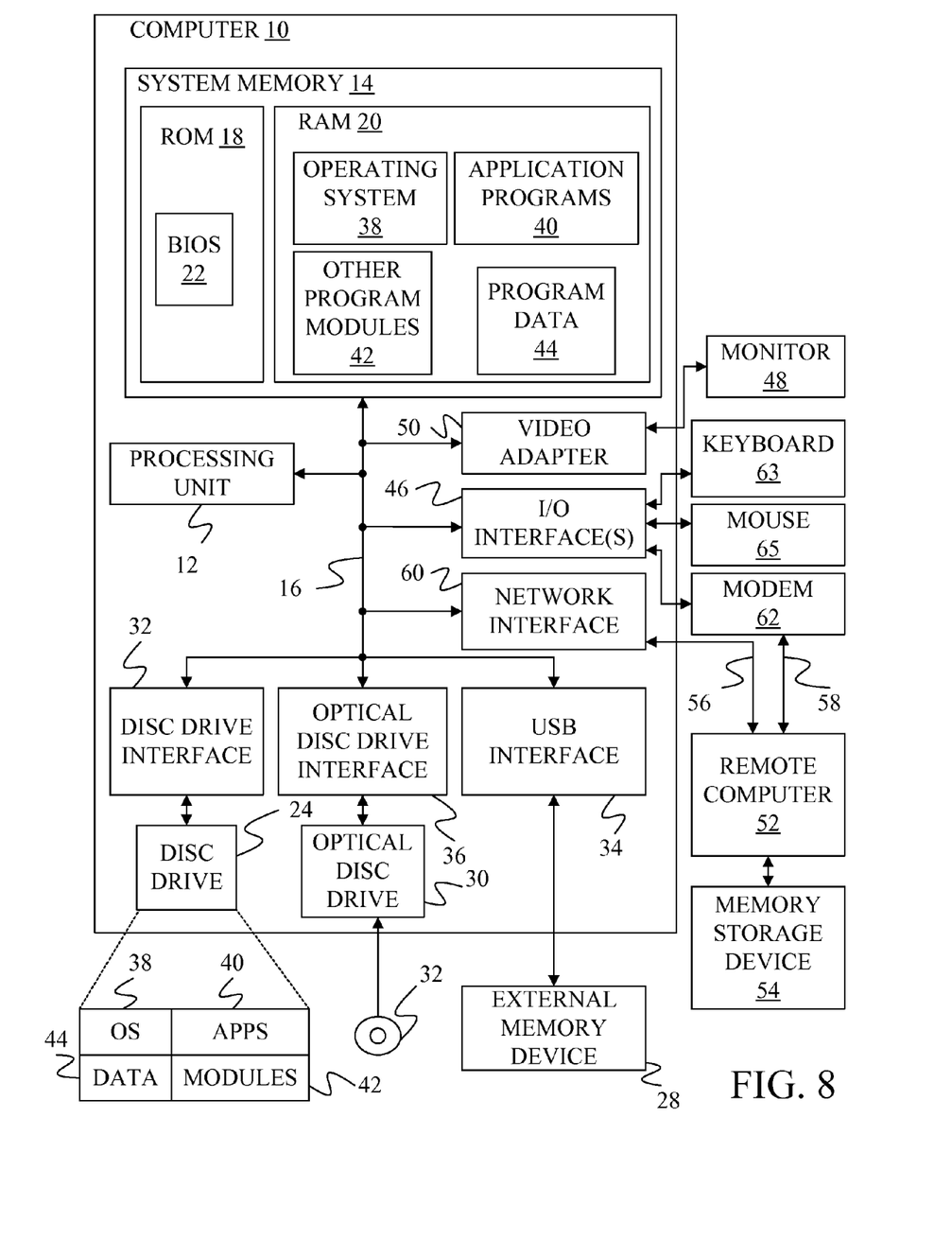
FIG. 8 is a block diagram of an example computing device.

An example of a computing device that can be used as a server or client device is shown in the block diagram of FIG. 8. The computing device 10 of FIG. 8 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS)/containing the basic routines that help to transfer information between elements within the personal computer 10, is stored in ROM 18.

Embodiments of the present invention can be applied in the context of computer systems other than personal computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computer 10 further includes a hard disc drive 24, an external memory device 28, and an optical disc drive 30. External memory device 28 can include an external disc drive or solid state memory that may be attached to computer 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage for the personal computer 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include any of the applications, robots or application interfaces discussed above and program data 44 may include data stored in any of the databases or lists discussed above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 8. The network connections depicted in FIG. 8 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the personal computer 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 8 are exemplary and other means for establishing a communications link between the computers, such as a wireless interface communications link, may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of administering a collaboration application using computers connected via a network, the method comprising:
   receiving an instruction via one of the computers to save a collaboration page posting from a revision poster;
   determining by executing a computer operation that the posting contains a word or phrase from a list of words or phrases relating to sensitive information, the sensitive information including offensive words or phrases, words or phrases that are considered confidential, words or phrases that are considered proprietary, or words or phrases that are associated with an asset;
   sending an e-mail to the revision poster via the network notifying them that the posting contains the word or phrase;
   identifying a specialist who is to be notified whenever the word appears on a collaboration page;
   identifying an administrator who is to be notified if any word from the list of words appears on a collaboration page, wherein the administrator is notified for more words from the list than the specialist; and
   sending messages to the specialist and the administrator to notify the specialist and the administrator that the word appeared in the posting.

2. The method of claim 1 wherein sending an e-mail comprises notifying the revision poster that the word relates to sensitive information of an entity.

3. The method of claim 1 wherein sending an e-mail comprises suggesting to the revision poster that the posting should be removed from the collaboration page.

4. The method of claim 1 further comprising setting an access parameter to reduce access to the collaboration page based on the word appearing in the posting.

5. A computer-readable medium having encoded thereon computer-executable instructions that when executed by a computer perform steps comprising:
   searching a wiki page for a word or phrase from a list of words or phrases relating to sensitive information, the sensitive information including offensive words or phrases, words or phrases that are considered confidential, words or phrases that are considered proprietary, or words or phrases that are associated with an asset;
   sending messages to persons associated with the entity that the word or phrase placed on the wiki page is sensitive information, the persons including:
   an administrator who is responsible for all wiki pages associated with a wiki application, a specialist who is responsible for limiting disclosure of the sensitive information, and a user who posted the sensitive information to the wiki page.

6. The computer-readable medium of claim 5 wherein searching a wiki page is triggered when content for the wiki page is saved in a wiki application.

7. The computer-readable medium of claim 5 further comprising reducing access to the wiki page after the sensitive information is found on the wiki page.

8. The computer-readable medium of claim 7 wherein reducing access to the wiki page comprises changing a security access level for the wiki page.

9. A method of administering a knowledge management system using computers connected via a network, the method comprising:
   assigning a first user responsibility for monitoring use of a first instance of sensitive information on knowledge management documents on a knowledge management system, the sensitive information including offensive words or phrases, words or phrases that are considered confidential, words or phrases that are considered proprietary, or words or phrases that are associated with an asset;
   assigning a second user responsibility for monitoring use of a second instance of sensitive information on the knowledge management documents on the knowledge management system; and
   the knowledge management system notifying the first user but not the second user via the network if the first instance of sensitive information appears on a knowledge management document on the knowledge management document system, and the knowledge management system notifying the second user but not the first user via the network if the second instance of sensitive information appears on a knowledge management document on the knowledge management document system;

notifying an administrator who is responsible for all knowledge management documents on the knowledge management system if the first instance of sensitive information appears on a knowledge management document on the knowledge management system, and notifying the administrator if the second instance of sensitive information appears on a knowledge management document on the knowledge management system.

10. The method of claim 9 further comprising notifying an author of a knowledge management document if the first instance of sensitive information appears in content produced by the author.

11. The method of claim 9 further comprising adjusting access to a knowledge management document if the first instance of sensitive information appears in the knowledge management document.

12. The method of claim 11 wherein adjusting access to a knowledge management document comprises changing a security level required to access the knowledge management document.

13. A computer-readable medium having computer-executable instructions encoded thereon that when executed on a computer performs steps comprising:

receiving an indication that a collaboration page has been changed;

determining that the collaboration page contains a word or phrase in a list of sensitive words or phrases, the sensitive words or phrases including offensive words or phrases, words or phrases that are considered confidential, words or phrases that are considered proprietary, or words or phrases that are associated with an asset;

changing access to the collaboration page such that fewer people can access the collaboration page after it has been changed than before it was changed based on the word or phrase being contained in the collaboration page, at least one person being able to access the collaboration page after access to the collaboration page is changed;

notifying an administrator and specialist associated with the word or phrase that the collaboration page contains the word or phrase and;

sending an e-mail message to a person who added the word or phrase to the collaboration page to notify the person that the collaboration page contains a sensitive word or phrase.

\* \* \* \* \*